United States Patent Office 3,448,364
Patented June 3, 1969

3,448,364
ELEVATOR MOTOR CONTROL SYSTEM INCLUDING DYNAMIC BRAKING WITH MOTOR FIELD EXCITATION
Phillip C. Keiper, Shrewsbury, N.J., assignor to Westinghouse Electric Corporation, Pittsburgh, Pa., a corporation of Pennsylvania
Filed Feb. 11, 1965, Ser. No. 431,808
Int. Cl. H02p 3/18, 7/32; B66b 1/06
U.S. Cl. 318—381       4 Claims

ABSTRACT OF THE DISCLOSURE

A buffer for an elevator car is designed for a car speed which is below rated car speed. An emergency terminal slowdown device assures reduction of car speed to a level suitable for the buffer. This device connects the direct-current traction motor for dynamic braking with the motor field connected to a first source of direct current through rectifiers. The field also is connected for excitation by the counter-E.M.F. from the motor armature through a full-wave rectifier. Whereby the field excitation is increased when the counter-E.M.F. is above the first source of direct current field excitation.

---

Figure 1:
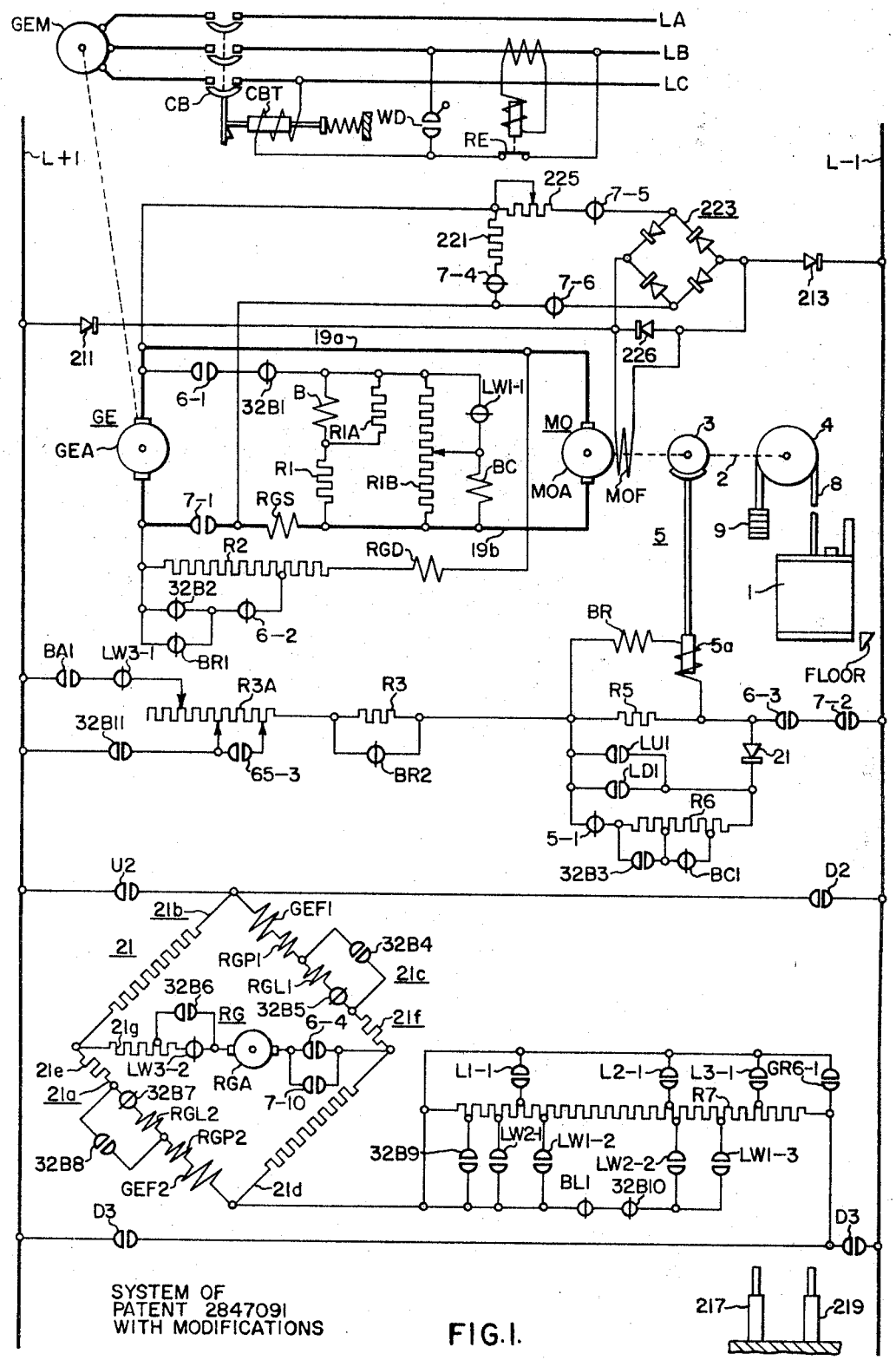

This invention relates to a vehicle system having dynamic braking and it has particular relation to an electric elevator system having a direct-current traction motor providing dynamic braking.

Although the invention is suitable for various vehicle systems employing an electric generator which is driven by the kinetic energy stored in the moving parts of the system, the invention is particularly applicable to electric elevators. For this reason the invention will be described as applied to an electric elevator.

In a conventional elevator, safety devices are provided for the purpose of stopping an elevator car under emergency conditions. One safety device employs a governor which is controlled in accordance with the speed of the car. If this speed exceeds a predetermined value which is in excess of the rated or contract car speed the governor operates to set a car safety. A somewhat similar governor which is responsive to the speed of a counterweight has been employed in an analogous manner for setting a counterweight safety.

Another safety device conventionally employed in an elevator is a car buffer which is located at the bottom of the hoistway. If the elevator car fails to slow down normally at the bottom terminal the buffer is engaged by the car for the purpose of bringing the car to a safe stop. A similar buffer has been employed for the counterweight.

These safeties and buffers operate independently of any electric power for safety stopping the elevator car in its downward travel or in similarly stopping the counterweight. These devices also are independent of the friction brake on the machine which drives the elevator car and of the traction between the hoist ropes and the machine drive sheave.

The car buffer is designed to stop the car and a full car load from 115% of rated speed with an average retardation of not more than 32.3 feet per second (termed a "gravity stop"). The governor must trip and set its safety at not more than 120% of rated car speed for speeds of over 800 feet per minute. Thus, if a car fails to slow down as it approaches the bottom terminal and if it is running at just under 120% of rated speed the buffer must stop the car from a speed which is not more than 3.4% above that from which the buffer will provide a gravity stop. If the car speed were higher than 120% of rated speed the car governor would trip to set its safety. The safety then would act to stop the elevator car before the car would engage its buffer.

As set forth in the American Standard Safety Code for Elevators, Dumb-Waiters and Escalators, A17.1–1960, published by the American Society of Mechanical Engineers, New York, N.Y., reduced-stroke buffers may be employed under certain conditions. For example, if an elevator car has a rated or contract speed of 1,800 feet per minute a buffer may be provided which is capable of producing a gravity stop from a speed of 1,195 feet per minute provided that an emergency terminal-slow-down device is employed.

The emergency terminal-slow-down device is required to limit the speed at which the elevator car can strike its buffer to the rated elevator speed for which the buffer may normally be used. For the example here considered such rated elevator speed would be 1,195 divided by 1.15 or 1,040 feet per minute. The emergency terminal-slow-down device which has been used depends on the braking of the elevator machine which in turn acts through the friction between the hoist ropes and the machine driving sheave to slow down the elevator car.

A mechanical friction brake on the machine provides ample torque to stop and hold the fully-loaded car from a slow speed but much greater torque is required to slow down the moving mass of the elevator system from a substantial speed at any appreciable rate of retardation. The additional torque required for this purpose normally is obtained through dynamic braking of the elevator motor. Such dynamic braking entails the placement of a resistance circuit across the armature of a direct-current motor which is coupled to the elevator car. The moving mass of the elevator system drives the motor which now acts as a generator. The resistance circuit brakes this generator to provide a braking torque acting to slow down the elevator car. The value of this dynamic braking torque varies with the speed of the motor, the excitation of its field and the value of the resistance connected across the motor armature. In conventional elevator systems one of these variables, the field excitation, depends on a source of electric power external to the motor. Therefore, a failure of this source of electric power would result in in the loss of the dynamic braking.

In accordance with the invention a source of excitation is provided for the motor field which is inherent within the motor itself.

It is therefore an object of the invention to provide improved dynamic braking equipment for a vehicle.

It is another object of the invention to provide an elevator system having a direct-current motor wherein the motor is employed for dynamically braking the elevator and wherein the field excitation for the motor during dynamic braking is derived from the motor itself.

Figure 2:
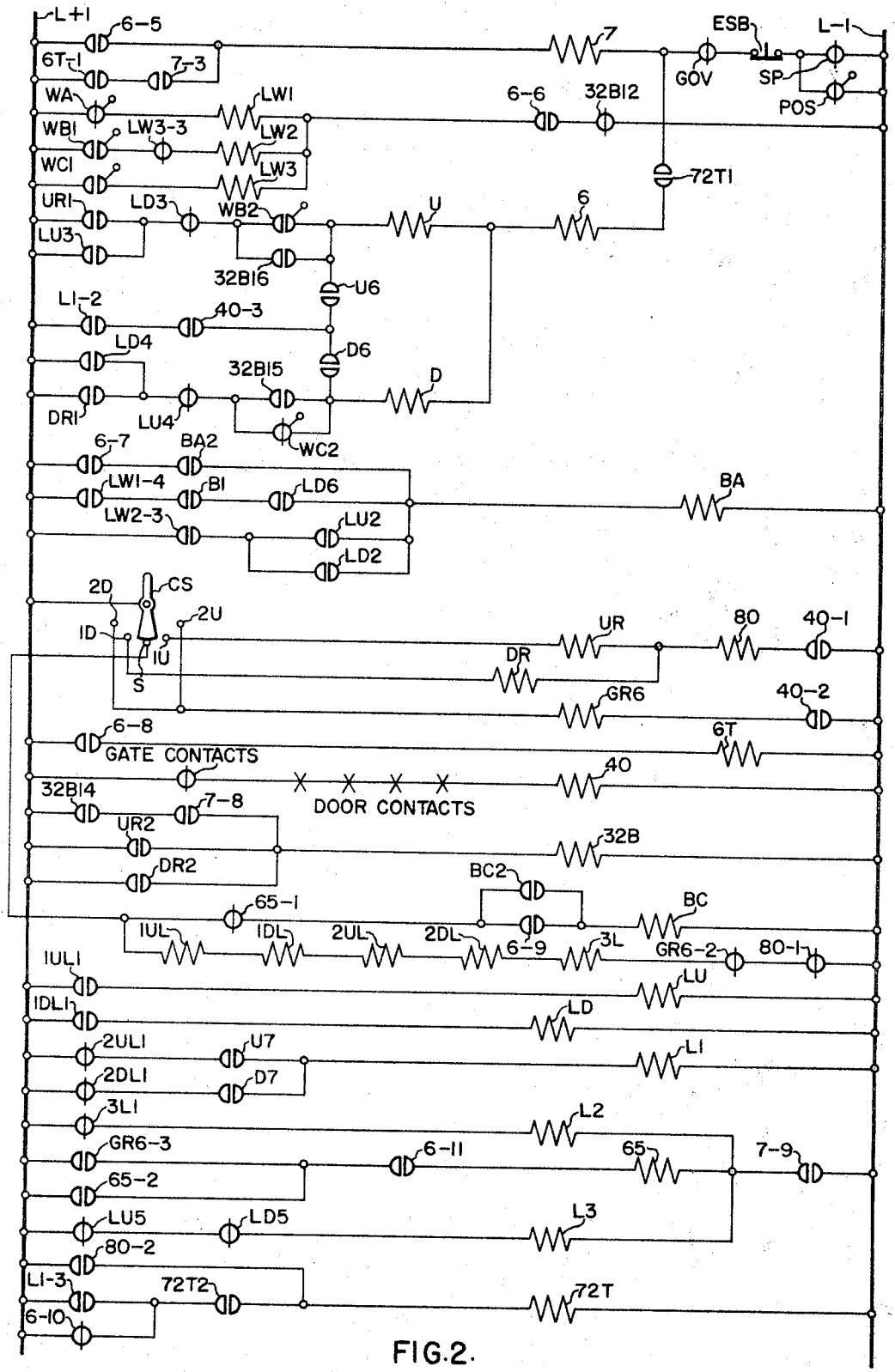

Other objects of the invention will be apparent from the following description taken in conjunction with the accompanying drawings in which FIGS. 1 and 2 are schematic views with circuits shown in straight-line form, of an elevator system embodying the invention.

In order to simplify the presentation of the invention it will be assumed that the invention is incorporated in the elevator system shown in the Santini et al. Patent 2,847,091 which issued Aug. 12, 1958. It will be assumed that the invention is applied to the elevator car 1 of the aforesaid patent. The components for the elevator car 1 appearing in FIGS. 3 and 4 of the aforesaid Santini et al. patent are reproduced in the present FIGS. 1 and 2. Similar components appearing in the present figures and in the aforesaid Santini et al. patent are identified by the same reference characters. For convenience the following list of components is provided:

MO—Motor
MOA—Motor armature
MOF—Motor field
4—Traction sheave
5—Brake
8—Ropes or cables
GE—Direct-current generator
1—Elevator car
D—Down switch
L+1, L—1—Direct-current buses
6—Running relay
7—Running contactor
U—Up switch
UR—Up relay
DR—Down relay
40—Door relay The foregoing components appearing in the present figures and in the aforesaid Santini et al. patent are identical with the exception of the following additions and changes. The running contactor 7 is provided in the present case with three sets of break contacts 7–4, 7–5 and 7–6 ("make" contacts are open and "break" contacts are closed when the relay is deenergized and dropped out).

Two rectifiers 211 and 213 are added for the present case. One terminal on the field winding MOF of the motor MO is connected to the bus L+1 through the rectifier 211. The remaining terminal of the field winding is connected to the bus L—1 through the rectifier 213. Assuming that the bus L+1 is a positive bus and the bus L—1 is a negative bus the rectifiers are poled to permit the flow of current from the bus L+1 through the field winding MOF to the bus L—1.

The elevator car 1 and a counterweight 9 for the elevator car are illustrated as attached to the ends of the rope 8. A counterweight buffer 217 and a car buffer 219 are located at the bottom of the hoistway for the purpose of retarding the counterweight 9 or the elevator car 1 respectively should one of these components overrun the lower terminal.

The elevator car 1 is intended to provide elevator service for several floors or landings of a building or structure in which the elevator system is located. One floor is illustrated in FIG. 1.

When the running contactor 7 drops out it closes its break contacts 7–4 to connect a dynamic braking resistor 221 across the armature MOA of the motor MO.

At the same time the break contacts 7–5 and 7–6 of the running contactor 7 close to connect the input terminals of a full-wave rectifier 223 across the armature MOA of the motor MO through an adjustable resistor 225 and one output terminal of the rectifier 223 is connected to the terminal of the field winding MOF which is also connected to the rectifier 213. The remaining output terminal of the rectifier 223 is connected to the terminal of the field winding MOF which is connected to the rectifier 211. The output of the rectifier 223 is so poled that current from this rectifier flows through the field winding MOF in the same direction followed by current supplied to the field winding from the buses L+1 and L—1. A rectifier 226 is shown connected across the field winding MOF. This rectifier is poled to provide a discharge path for current produced when the field winding MOF is deenergized. Such a discharge rectifier is well known in the art. Inasmuch as the rectifier 223 also provides a discharge path across the field winding MOF the rectifier 226 may be omitted if so desired.

As shown in FIG. 2, the running contactor 7, the running relay 6, the up switch U and the down switch D are operated in the same manner set forth in the aforesaid Santini et al. patent except that for these components to be energized a main governor switch GOV, an emergency stop button ESB and either an auxiliary governor switch SP or a position switch POS additionally must be closed.

The main governor switch GOV is closed during operation of the elevator car at or below its contract or rated speed. It is set to trip or open at a predetermined speed which is above the rated speed, say at 120% of rated speed. Governors having switches of this type are well known in the art.

The emergency stop button ESB is normally closed and may be manually operated to open position when the elevator is to be brought to an emergency stop.

The auxiliary governor switch SP is responsive to the speed of the car. This switch is closed at lower speeds of the elevator car. It is open when the elevator car travels at any speed in excess of the rated striking speed of the buffer. This rated striking speed is assumed to be substantially less than the contract or rated speed of the elevator car.

The position switch POS is normally closed. The switch is located in the hoistway and is set to be opened by a cam on the elevator car when the elevator car in approaching its buffer reaches a point spaced from the buffer by the distance required to slow the car from contract or rated speed to the buffer rated striking speed before the buffer is contacted by the car. The switch similarly may be operated by the counterweight as the counterweight approaches its buffer.

As the elevator car approaches the lower terminal the position switch POS may open. However, under normal conditions the elevator car has slowed for the landing sufficiently by this time for the auxiliary governor switch SP to be closed. So long as the emergency stop button ESB, the switch GOV and one of the switches SP or POS are closed, the present system operates in the same manner discussed in the aforesaid Santini et al. patent. Operation of the contacts 7–4, 7–5 and 7–6 of the running contactor under these circumstances do not affect the performance of the car. For this reason the present discussion of the operation of the system will be directed primarily to emergency stopping of the elevator car.

Let it be assumed that the elevator car is traveling down towards its buffer. If the speed of the elevator car reaches 120% of its rated speed the main governor switch GOV opens to drop out promptly the running relay 6 and the running contactor 7.

The running relay 6 operates its contacts in the manner specified in the aforesaid Santini et al. patent. As shown in such patent, one of the results is the opening of the sets of contacts 6–3 to set the brake 5.

However, the prompt drop out of the running contactor 7 results in a powerful dynamic braking assist to the slow down of the elevator car. As shown in the Santini et al. patent the drop out of the running contactor 7 opens the contacts 7–1 to interrupt the loop circuit connecting the armature GEA and MOA. At the same time closure of the contacts 7–4 connects the resistor 221 across the armature MOA to provide a strong dynamic braking torque acting to slow down the elevator car rapidly from its high speed. At low car speeds the dynamic braking torque becomes small, but at such low speeds the mechanical brake 5 is adequate for stopping the elevator car within a reasonable distance and holding it stopped.

If the emergency stop button ESB is operated while the elevator car is traveling down, the running relay 6 and the running contactor 7 again are promptly dropped out. These components then operate in the manner discussed above to provide dynamic and mechanical braking of the elevator car.

Finally, let it be assumed that the elevator car reaches the position at which the position switch POS operates while traveling down at rated speed. At this speed the auxiliary governor switch SP is open. Consequently, when the position switch POS opens, the running relay 6 and the running contactor 7 promptly drop out to provide dynamic and mechanical braking of the car in the manner previously discussed. This assures rapid slow down of the elevator car to a speed which the buffer 219 can handle comfortably.

The drop out of the running contactor 7 also is accompanied by closure of the break contacts 7–5 and 7–6 to connect the armature MOA of the motor MO across the field winding MOF through the adjustable resistor 225 and the full-wave rectifier 223. Consequently even should the source of energy connected to the buses L+1 and L—1 fail, the field winding MOF conutinues to be energized from the armature MOA to provide the desired dynamic braking effort. The residual field flux of the motor MO assures operation of the motor as a self-excited generator even if such source of energy fails.

If the buses L+1 and L—1 are energized from a rotating machine such as an exciter (not shown) driven by the motor GEM the inertia of the rotating parts continues the energization of the buses for a short time following failure of the source of energy for the motor GEM. If the source of energy for the buses L+1 and L—1 is of a static type a failure of the source results in prompt deenergization of the buses L+1 and L—1.

The full-wave rectifier 223 and the rectifiers 211 and 213 provide a maximum voltage connection for the field winding MOF. This means that the field winding MOF is excited by the larger of the voltage across the L+1 and L—1 and the voltage output of the full-wave rectifier 223.

With the illustrated system effective emergency slow down and stopping of the elevator car is obtained even though the source of energy for the buses L+1 and L—1 is lost at the start of the stopping operation. The inherent source of excitation provided by the motor MO for the field winding MOF assures a continuously-available dynamic braking effort which at least suffices to bring the car speed down to a value within the capacity of a reduced-stroke buffer.

Because of the full-wave rectifier 223 the direction of current supplied therethrough to the field winding MOF is independent of the direction of rotation of the armature MOA. Thus such current assures dynamic braking for both directions of car travel.

Preferably the resistor 225 is proportioned to provide a field self-excitation having a value approximately 150% of the normal full-field excitation supplied from the buses L+1 and L—1 when the motor armature is rotating at its rated or contract rotation. Inasmuch as the motor field magnetic circuit is normally well saturated at this normal full-field excitation, the increased current represented by this 150% value will not increase the field flux very much beyond the normal full-field value. As the motor armature slows, its generated voltage will reduce until at 67% of the rated or contract rate of rotation approximately full-field current exists, thus maintaining more nearly a constant braking torque as the armature slows.

During normal running of the elevator the make contacts 7–1, which are closed when the running contactor 7 picks up, connect the motor armature MOA across the generator armature GEA through the field winding RGS. At the same time the break contacts 7–4 are open to disconnect the dynamic braking resistor from the motor armature and the break contacts 7–5 and 7–6 are open to disconnect the rectifier 223 and the motor field winding MOF from the motor armature.

Although the rectifiers 211 and 213 may be omitted they are preferably employed. They protect loads connected across the buses L+1 and L—1 from the high voltage generated by the motor armature MOA during dynamic braking.

Although the invention has been described with reference to certain specific embodiments thereof, numerous modifications falling within the spirit and scope of the invention are possible.

I claim as my invention:

1. In an elevator system, a building structure having vertically-spaced floors, an elevator car, means mounting the elevator car for movement in a vertical path relative to the structure to provide elevator service for said floors, motive means including a direct-current motor having field-winding means provided with first and second terminals and wound-armature means for moving said elevator car at a rated speed in said path, a buffer disposed at one end of said path for bringing to rest the elevator car if it overshoots its normal travel, said buffer having insufficient capacity to retard the car from 115% of rated speed at an average retardation not exceeding 32.2 feet per second per second, a first source of direct-current having third and fourth terminals, means coupling said field-winding means for excitation in a predetermined direction from said first source, a second source of direct-current, control means for controlling said motive means to move said elevator car and to stop the elevator car at selected floors, said control means being operable from a first condition effective to supply current from said second source to said wound-armature means, whereby the car is moved, to a second condition effective for interrupting the supply of current from said second source to said armature means, dynamic braking resistance means, means, means responsive to operation of said control means from said first condition to said second condition for coupling said dynamic braking resistance means to said wound-armature means to provide dynamic braking for said motor, and transfer means responsive to operation of said control means from said first condition to said second condition for transferring the field winding means from a first condition wherein said field-winding means receives no excitation from said wound-armature means to a second condition wherein the field-winding means is coupled to receive excitation in said predetermined direction from the wound-armature means.

2. A system as claimed in claim 1 wherein said first named coupling means comprises first and second rectifiers, means coupling the first terminal to the third terminal through the first rectifier and means coupling the second terminal to the fourth terminal through the second retcifier, said rectifiers being poled to conduct current through said field-winding means in a first direction corresponding to the polarity of the first source, said transfer means including a full-wave rectifier having input terminals and output terminals coupling the field-winding means for excitation from said wound-armature means in the second condition of the field-winding means, said full-wave rectifier for said last-named condition having its input terminals connected for energization from said wound-armature means, and its output terminals connected across the field-winding means to supply current to said field-winding means in said first direction, whereby the maximum voltage of the first source and the wound-armature means is available for energizing the field-winding means.

3. In an elevator system, a building structure having vertically-spaced floors, an elevator car, means mounting the elevator car for movement in a vertical path relative to the structure to provide elevator service for said floors, motive means including a direct-current motor having field-winding means provided with first and second terminals and wound-armature means for moving said elevator car at a rated speed in said path, a buffer disposed at one end of said path for bringing to rest the elevator car if it overshoots its normal travel, said buffer having insufficient capacity to retard the car when carrying a full car load from 115% of rated speed at an average retardation not exceeding 32.2 feet per second per second, a first source of direct-current having third and fourth terminals, means coupling said field-winding means for excitation in a predetermined direction from said first source, a second source of direct-current, control means for controlling said motive means to move said elevator car and to stop the elevator car at selected floors, said control means being operable from a first condition effective to supply current from said second source to said wound-armature means, whereby the car is moved, to a second condition effective for interrupting the supply of current from said second source to said armature means, dynamic braking resistance means, means responsive to operation of said control means from said first condition to said second condition for coupling said dynamic braking resistance means to said wound-armature means to provide dynamic braking for said motor, and transfer means responsive to operation of said control means from said first condition to said second condition for transferring the field-winding means from a first condition wherein said field-winding means receives no excitation from said wound-armature means to a second condition wherein the field-winding means is coupled to receive excitation in said predetermined direction from the wound-armature means.

4. A system as claimed in claim 3 wherein said first-named coupling means comprises rectifier means, and means coupling the third terminal to the fourth terminal through the field-winding means and said rectifier means in series, for exciting the field-winding means in said predetermined direction from said first source.

References Cited

UNITED STATES PATENTS 2,484,836  10/1949  King _____ 318—145
2,847,091  7/1958  Santini et al. _____ 187—29

ORIS L. RADER, *Primary Examiner.*

T. E. LYNCH, *Assistant Examiner.*

U.S. Cl. X.R.

187—29; 318—145, 154